United States Patent
Taniuchi

(10) Patent No.: US 6,921,188 B2
(45) Date of Patent: Jul. 26, 2005

(54) VEHICLE LAMP AND METHOD

(75) Inventor: Hitoshi Taniuchi, Yamanashi-Ken (JP)

(73) Assignee: Stanley Electric Co., Ltd., Tokyo (JP)

(*) Notice: Subject to any disclaimer, the term of this patent is extended or adjusted under 35 U.S.C. 154(b) by 29 days.

(21) Appl. No.: 10/436,371

(22) Filed: May 13, 2003

(65) Prior Publication Data

US 2004/0022067 A1 Feb. 5, 2004

(30) Foreign Application Priority Data

May 13, 2002 (JP) ........................................ 2002-137130

(51) Int. Cl.[7] .............................. F21V 7/00; F21V 13/10
(52) U.S. Cl. ........................ 362/517; 362/284; 362/297; 362/346; 362/539
(58) Field of Search ................................ 362/517, 297, 362/538–539, 277, 512, 346, 351, 319, 544, 282, 284

(56) References Cited

U.S. PATENT DOCUMENTS

| 6,419,380 B2 * | 7/2002 | Oyama et al. ............... 362/517 |
| 2002/0085387 A1 | 7/2002 | Taniuchi |
| 2002/0089853 A1 | 7/2002 | Taniuchi et al. |
| 2002/0186565 A1 | 12/2002 | Taniuchi et al. |

FOREIGN PATENT DOCUMENTS

| EP | 1126210 A2 | 8/2001 |
| JP | 1-159901 | 6/1989 |
| JP | 2001-202805 | 7/2001 |
| JP | 2002-231018 | 8/2002 |

* cited by examiner

Primary Examiner—Sandra O'Shea
Assistant Examiner—Guiyoung Lee
(74) Attorney, Agent, or Firm—Morgan, Lewis & Bockius LLP

(57) ABSTRACT

A vehicle lamp emitting light to a lateral direction can include a simple construction to reduce design limitations, and can achieve desired light distribution characteristics by controlling the direction and intensity of light illuminated in a range covering the front and the side of the vehicle. The vehicle lamp preferably includes: a second reflecting surface for reflecting incident light from a light source to a predetermined direction; a third reflecting surface, arranged forward of the light source and backward of a projection lens and out of a main optical path, for reflecting light from the second reflecting surface toward front; and a fourth reflecting surface, arranged forward of the third reflecting surface and out of the main optical path, for reflecting light from the third reflecting surface to a lateral direction relative at least to a region of light emitted from the projection lens along the main optical path.

20 Claims, 8 Drawing Sheets

Fig.10A
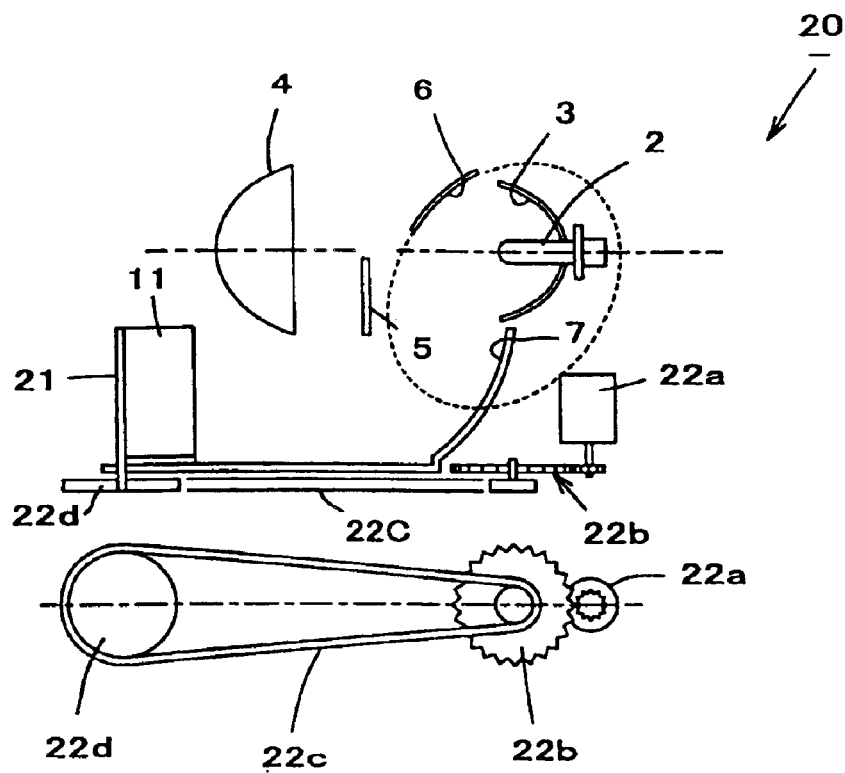
Fig.10B
Fig.11
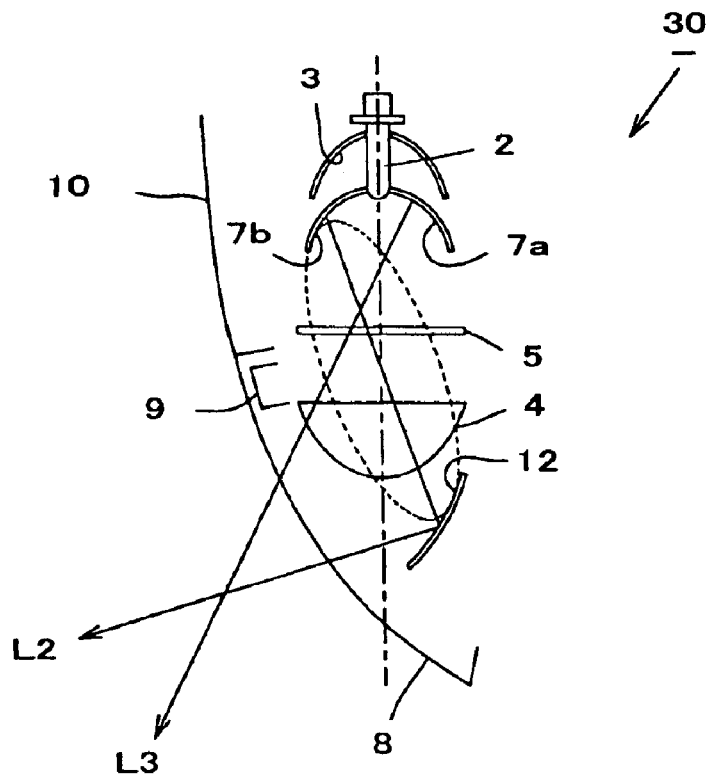

VEHICLE LAMP AND METHOD

This invention claims the benefit of Japanese Patent Application No. 2002-137130 filed on May 13, 2002, the disclosure of which is hereby incorporated by reference.

BACKGROUND OF THE INVENTION

1. Field of the Invention

The present invention relates to vehicle lamps used as headlamps or auxiliary front lamps such as fog lamps. More particularly, it relates to vehicle lamps that are capable of emitting light that includes a component of the light directed in a lateral direction.

2. Description of the Related Art

One example of a related or conventional vehicle lamp capable of emitting light into a lateral direction is shown in FIG. 1A to FIG. 1C. In this specification, a front to back direction or a left to right direction refers to a corresponding direction viewed from a reference point, which is a headlamp mounted on a vehicle body. For example, "front", "frontward", or "forward" means the main illuminating direction or the direction of optical axis of a light source. And "side", "sideward", or "a lateral direction" means the right side of the vehicle when referring to a headlamp mounted on a right front side of a vehicle body.

The headlamp 90 shown in the drawing is the headlamp to be mounted on a right front side of a vehicle body. It includes a light source 92, a first reflecting surface 93, a projection lens 94, a shutter 95, a second reflecting surface 96, a third reflecting surface 97, a front lens 98, and an accessory 99. Reference numeral 100 denotes the vehicle body. The first reflecting surface 93 is constructed of, for example, an ellipsoidal reflecting surface having a first focus on the light source 92, and reflects light from the light source 92 toward front. The projection lens 94 converges direct light from the light source 92 and reflected light from the first reflecting surface 93 to a certain extent and emits light toward front. The shutter 95 is arranged near the focus of the projection lens 94 in the optical path (hereinafter referred to also as "main optical path") of direct light from the light source 92 or reflected light from the first reflecting surface 93 to the projection lens 94, for blocking light to adjust the light distribution pattern.

The second reflecting surface 96 is constructed of an ellipsoidal reflecting surface. Its first focus is positioned on the light source 92. The longitudinal axis of the second reflecting surface 96 extends diagonally with respect to the main optical path, so that light emitted from the light source 92 to a forward and upward direction is reflected by the second reflecting surface 96 to a backward and downward direction.

The third reflecting surface 97 is constructed of a parabolic reflecting surface, and has its focus near the second focus of the second reflecting surface 96. In the illustrated example, the third reflecting surface 97 is made up of a compound reflector consisting of two reflecting portions 97a and 97b. The portion 97a on the left side of a vertical plane including the optical axis (right side in the drawing) reflects light reflected from the second reflecting surface 96 into a lateral direction. The portion 97b on the right side of the vertical plane passing trough the optical axis (left side in the drawing) reflects the light reflected from the second reflecting surface 96 into a middle region between the front and the side.

Light emitted from the light source 92 enters the projection lens 94 directly or indirectly via the first reflecting surface 93, where it is converged to a certain extent and emitted to the front. Part of the light to enter the projection lens 94 is blocked by the shutter 95, whereby a certain desired light distribution pattern is achieved in which no upward light beam is included, so as not to cause glare to an oncoming vehicle. This light illuminates a range denoted at L1 in FIG. 3, whereby a light beam known as a passing beam or a low beam is formed.

The forward and upward light from the light source 92, which will not be emitted from the projection lens 94 located in the front of the light source 92, is reflected by the second reflecting surface 96 and further reflected by the third reflecting surface 97. The light reflected by the left portion 97a of the third reflecting surface 97 is directed to the right side of the vehicle, and illuminates a range denoted at L2 in FIG. 3.

Meanwhile, the light reflected by the right portion 97b of the third reflecting surface 97 is directed to the middle region between the front and the right side and illuminates this middle region denoted at L3 in FIG. 3. The middle illumination range L3 extends across the front illumination range L1 and the right side illumination range L2 to provide smooth illuminance shift from the front illumination range L1 to the right side illumination range L2.

The vehicle lamp 90 thus illuminates both the front and the side of the vehicle with improved visibility in the moving direction of the vehicle when driving on a winding road or making a left or right turn, or a U-turn. The light distribution characteristics regarding the illumination range L1 are adjusted by means of the projection lens 94 and the shutter 95 so as to illuminate the front of the vehicle from near to far range.

The projection lens 94 alone cannot distribute light over a wide range as far as, for example, 90° in a left to right direction relative to an optical axis of the headlamp 90. Reflected light from the third reflecting surface 97 thus functions as supplementary light for illuminating a wider area than the illumination range L1 of the projection lens 4, i.e., it covers the illumination range L2 in the lateral direction and the illumination range L3 which is the middle region between the illumination ranges L1 and L2.

The optical system of this related art example has such settings that the illumination range L1 covers an area from 40° on the left to 40° on the right with respect to the front direction 0°, the illumination range L2 covers an area from 30° to 70° on the right, and the illumination range L3 covers an area from 20° to 50° on the right.

The front lens 98 of the vehicle lamp 90 extends over the whole light emitting region as shown in FIG. 1A. It covers and protects the inside, i.e., the light source 92, first reflecting surface 93, projection lens 94, shutter 95, second reflecting surface 96, and third reflecting surface 97. Thus, since the optical system of this related art example has a setting such that the portion 97a of the third reflecting surface 97 directs light into a range including a direction at 70° on the right side, the front lens 98 needs to extend over this lateral optical path.

Also, because of the need to secure this lateral optical path, there are limitations on the inside layout of the headlamp 90 or installation space of the accessory 99, which is usually fitted in this side portion of the headlamp 90.

That is, according to the construction of the related art example, the front lens 98 needs to be designed such as to extend largely to the side face of the vehicle, and the accessory 99 installed inside the headlamp 90 needs to be formed with a cutout portion 99a as shown in FIG. 2, i.e., there are large limitations on the design of the entire headlamp 90 including the front lens 98.

The optical system of this related art example is fixed such that the portion 97a of the third reflecting surface 97 directs light into a side range including a direction at 70° on the right. However, when turning, it is preferable that the visibility in the driving direction i.e., forward of the curve, is more brightly illuminated, rather than the side illumination. For example, when the vehicle turns to the left, it is preferable that the headlamp 90 mounted on the right front side of the vehicle body can illuminate the front, including the left front if possible, of the vehicle rather than the right side.

SUMMARY OF THE INVENTION

The present invention has been devised in view of the above and other problems. The present invention can provide a vehicle lamp which is capable of emitting light to a lateral direction and which has a simple construction so as to reduce design limitations as much as possible. The present invention can also provide a vehicle lamp capable of achieving desired light distribution characteristics by controlling the directions and intensities of light illuminated in ranges covering the front and the side of the vehicle.

According to one aspect of the present invention, a vehicle lamp includes: a light source; a first reflecting surface for reflecting light from the light source toward front; a projection lens for converging direct light from the light source and reflected light from the first reflecting surface to a predetermined extent toward front; a shutter, arranged in a main optical path of the light from the light source to the projection lens, for blocking part of the main optical path; a front lens for covering a light emitting region of the vehicle lamp; a second reflecting surface for reflecting incident light from the light source to a predetermined direction; a third reflecting surface, arranged forward of the light source and backward of the projection lens and out of the main optical path, for reflecting incident light from the second reflecting surface toward front; and a fourth reflecting surface, arranged forward of the third reflecting surface and out of the main optical path, for further reflecting light reflected from the third reflecting surface to a lateral direction relative at least to a region of light emitted from the projection lens along the main optical path.

In the vehicle lamp as configured above, it is preferable that the second reflecting surface is an ellipsoidal reflecting surface having a first focus on the light source. Also it is preferable that the third reflecting surface includes a reflecting surface selected from a group consisting of a parabolic reflecting surface having a focus in the vicinity of a second focus of the second reflecting surface, an ellipsoidal reflecting surface having a first focus in the vicinity of the second focus of the second reflecting surface, and a compound reflector of these reflecting surfaces. Furthermore, it is preferable that one part of reflected light from the third reflecting surface is reflected by the fourth reflecting surface, while the other part of the reflected light from the third reflecting surface is directly emitted to the outside without reaching the fourth reflecting surface.

Furthermore, in the above configured vehicle lamp, the fourth reflecting surface is preferably attached to a substantially vertical rotating shaft such as to be rotatable around the rotating shaft.

Also, in the vehicle lamp as above, the third reflecting surface may include either a compound reflector or a plurality of reflecting surfaces including a first reflecting region for reflecting incident light toward the fourth reflecting surface and a second reflecting region for reflecting incident light not toward the fourth reflecting surface. Furthermore, the second reflecting region of the third reflecting surface may be designed so that a region illuminated by reflected light from the second reflecting region of the third reflecting surface overlaps at least part of the region of light emitted from the projection lens along the main optical path.

In the above vehicle lamp, the third reflecting surface is preferably designed so that a region illuminated by the other part of the reflected light from the third reflecting surface overlaps at least part of the light emitted from the projection lens along the main optical path.

Furthermore, the vehicle lamp may be configured such that the fourth reflecting surface is switched between a position for reflecting light toward a lateral direction and a position for reflecting light such as to overlap at least part of either one of a region illuminated by the light emitted from the projection lens along the main optical path and a region illuminated by the reflected light from the third reflecting surface.

According to the above construction, direct light from the light source or reflected light from the first reflecting surface enters the projection lens and is beamed toward front. At this time, the shutter blocks part of light to be incident into the projection lens, so that the light distribution characteristics are those of a low beam which does not cause glare to an oncoming vehicle.

Part of the light emitted from the light source is reflected by the second, third, and fourth reflecting surfaces in turn, and illuminates at least one predetermined range covering the side and/or front of the vehicle. These reflecting surfaces thus provide additional light for supplementing the light from the projection lens for illuminating the front and the side of the vehicle. Thereby, the lamp offers better visibility as it illuminates the driving direction of the vehicle, particularly when driving on a winding road or making a left or right turn, or a U-turn.

Since part of the light emitted from the light source is used for illuminating the side of the vehicle by the fourth reflecting surface, i.e., forward and upward light beams from the light source are directed by the second, third, and fourth reflecting surfaces to the lateral direction, the amount of light for illuminating the front through the projection lens is not decreased. That is, the forward and upward light beams from the light source, which were conventionally not utilized, are efficiently used.

Also, since the light beamed into the fourth reflecting surface is a reflected light beam directed forward from the third reflecting surface, the fourth reflecting surface can be positioned at the relatively far front of the light source within the inside structure of the headlamp. Accordingly, the light from the fourth reflecting surface to the lateral direction is directed from a point relatively far forward of the light source.

This means that the optical path is made to change its direction by the fourth reflecting surface located at a relatively far front portion of the lamp to the lateral direction, and therefore, in this particular embodiment of the invention, the front lens need not extend as far as to the side face for covering the light emitting region of the third reflecting surface as in the related art. This allows more freedom in layout of the accessory inside the lamp, which in turn leads to more freedom in design of the entire lamp.

Furthermore, the third reflecting surface includes more than one reflecting portion for reflecting light from the second reflecting surface, and one reflecting portion reflects it into a middle region between the front and the side, in addition to the front direction illumination by the first reflecting surface and the projection lens. The light reflected by this portion of the third reflecting surface can illuminate the middle region covering both part of the front illumination range of the projection lens and part of the side illumination range of the fourth reflecting surface, whereby both illumination ranges are joined smoothly. In other words, the direction and intensity of the illumination light from front to side can be adjusted as required to achieve desired light distribution characteristics.

The second reflecting surface can be constructed of an ellipsoidal reflecting surface having its first focus on the light source. In one example, the third reflecting surface can be constructed of a parabolic reflecting surface having its focus in the vicinity of the second focus of the second reflecting surface. The reflected light from the second reflecting surface is converged into its second focus or in the vicinity of the focus of the third reflecting surface, and further reflected by the third reflecting surface toward either the fourth reflecting surface as parallel light or to the front outside of the vehicle headlamp. In this example, the fourth reflecting surface is constructed of a plane mirror. The light reflected from the third reflecting surface to the fourth reflecting surface is further reflected by the fourth reflecting surface and emitted as parallel light to the lateral direction.

According to another embodiment, while the second reflecting surface is constructed of an ellipsoidal reflecting surface having its first focus on the light source, the third reflecting surface can be constructed of an ellipsoidal reflecting surface having its first focus in the vicinity of the second focus of the second reflecting surface. In the case where the fourth reflecting surface is constructed of a parabolic reflecting surface having its focus in the vicinity of the second focus of the third reflecting surface, the reflected light from the second reflecting surface is converged into its second focus or in the vicinity of the first focus of the third reflecting surface, further reflected by the third reflecting surface and converged into its second focus near the focus of the fourth reflecting surface, whereupon it is reflected by the fourth reflecting surface and emitted as parallel light to the lateral direction.

In the case where the fourth reflecting surface is supported rotatably around a substantially vertical rotating shaft, the switching between the state wherein the reflected light from the fourth reflecting surface is emitted to the side and the state wherein it is emitted to the front can be achieved by a revolving motion of the fourth reflecting surface around the rotating shaft. The switching between the side illumination and the front illumination may either be made selectively or continuously.

For example, the fourth reflecting surface may be rotated in accordance with the steering angle, or by some other switch activating means. By thus adjusting the illuminating direction of the reflected light from the fourth reflecting surface enabling real-time control of the illumination intensity over a particular range covering the front and side of the vehicle, desired light distribution characteristics can be achieved as required in various situations, e.g., the frontward lighting during driving on a straight road may be switched to sideward lighting when driving on a winding road or making a left or right turn, so that the lamp always offers good visibility in the driving direction.

BRIEF DESCRIPTION OF THE DRAWINGS

These and other objects and advantages of the present invention will become clear from the following description with reference to the accompanying drawings, wherein:

FIG. 10A is a schematic side view, and FIG. 10B is a schematic bottom plan view, illustrating another construction for a driver in the vehicle headlamp of FIG. 7A to FIG. 7C; and FIG. 11 is a schematic top plan view illustrating major parts of a modified example of the vehicle lamp of FIG. 4A to FIG. 4C.

DETAILED DESCRIPTION OF PREFERRED EMBODIMENTS

Figure 1A:
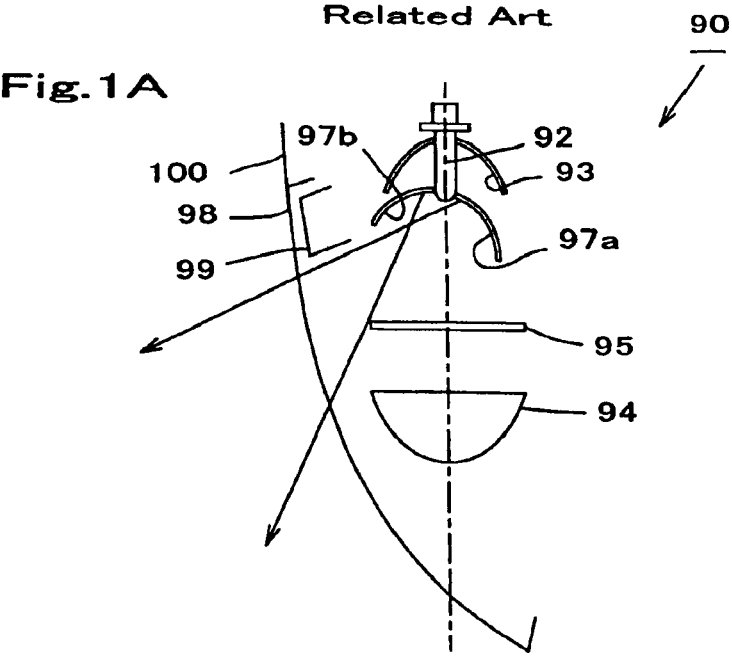
FIG. 1A to FIG. 1C illustrate one related art example of a vehicle headlamp, FIG. 1A being a schematic cross section taken along the line IA—IA of FIG. 1B, FIG. 1B being a schematic front view, and FIG. 1C being a schematic cross section taken along the line IC—IC of FIG. 1B.
Figure 1B:
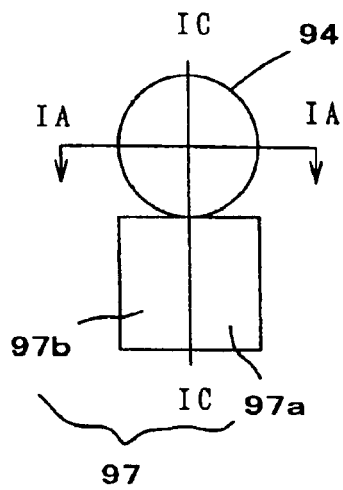
Figure 1C:
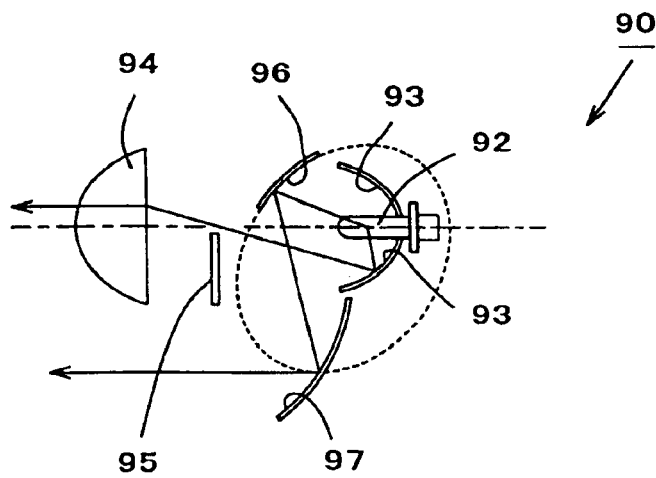
Figure 2:
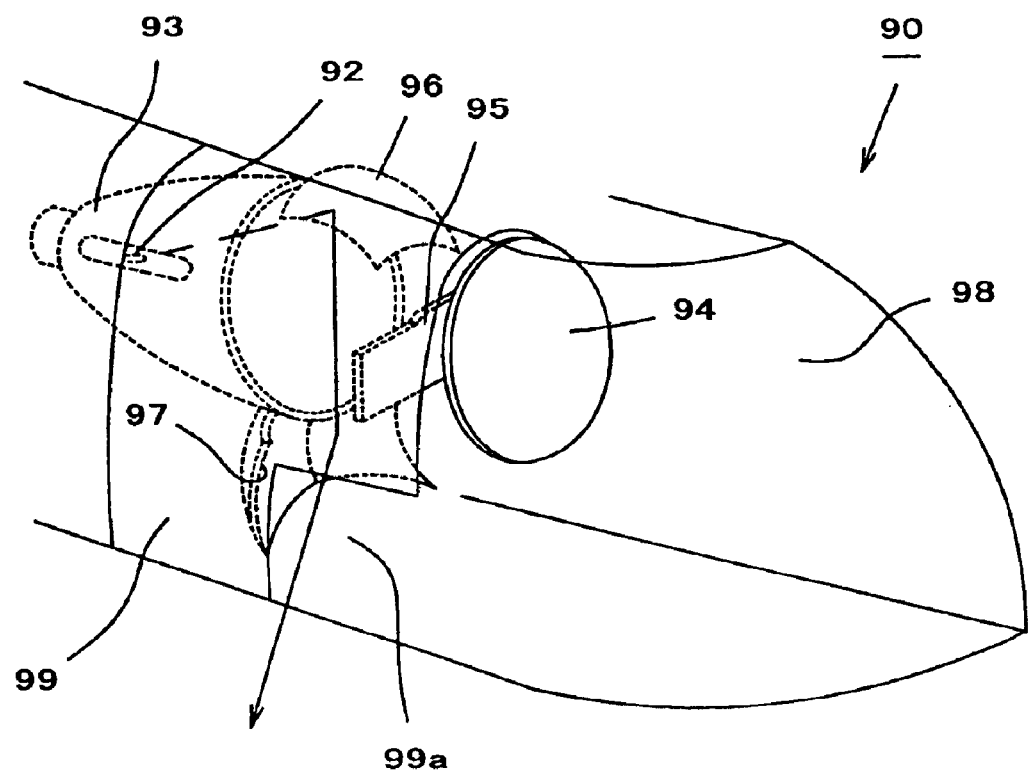
FIG. 2 is a schematic perspective view of the vehicle headlamp of FIG. 1A to FIG. 1C.
Figure 3:
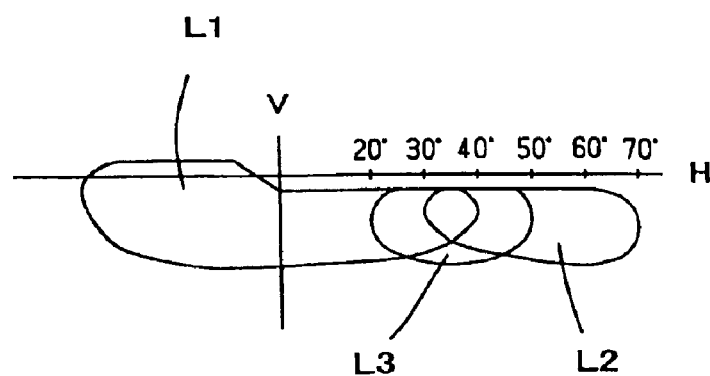
FIG. 3 is a diagram showing a light distribution pattern on a screen of the vehicle lamp of FIG. 1A to FIG. 1C.
Figure 4A:
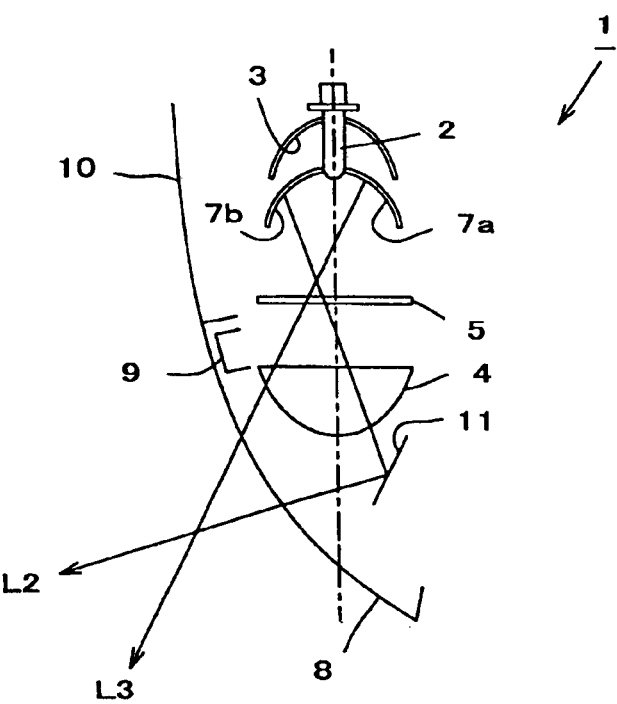
FIG. 4A to FIG. 4C illustrate a vehicle headlamp according to one embodiment of the present invention, FIG. 4A being a schematic cross section taken along the line IVA—IVA of FIG. 4B, FIG. 4B being a schematic front view, and FIG. 4C being a schematic cross section taken along the line IVC—IVC of FIG. 4B.
Figure 4B:
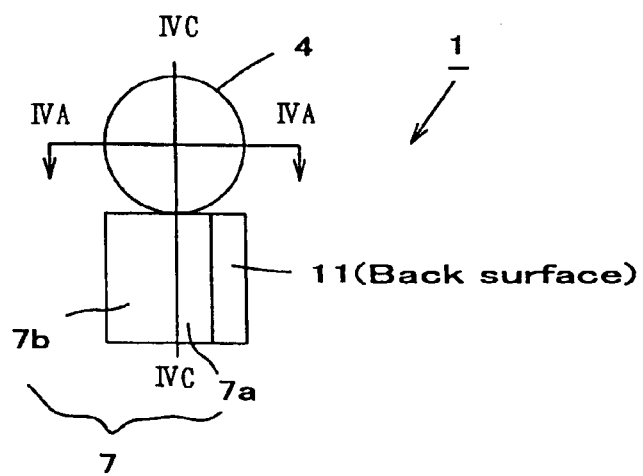
Figure 4C:
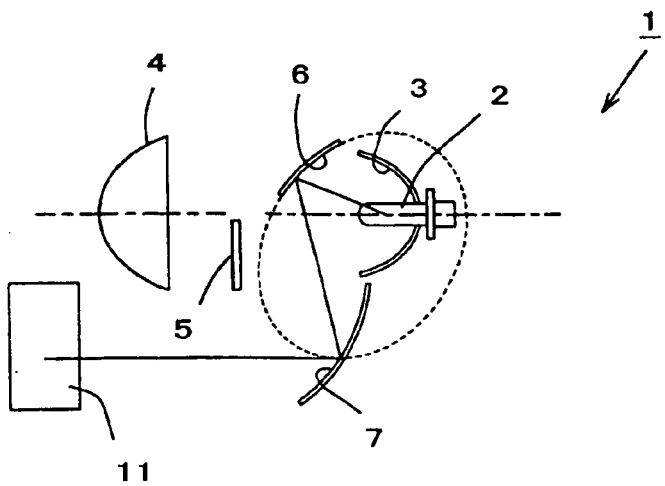
Figure 5:
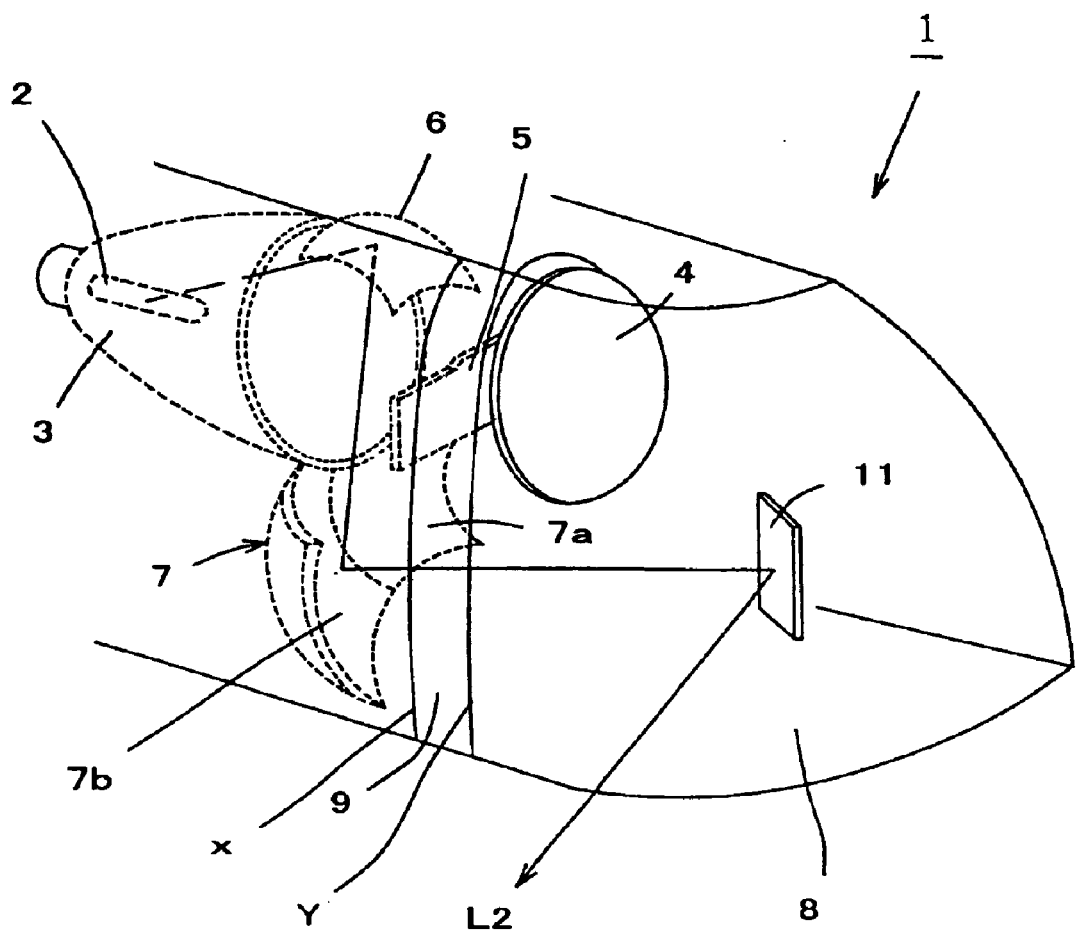
FIG. 5 is a schematic perspective view of the vehicle lamp of FIG. 4A to FIG. 4C.

Preferred embodiments of the present invention will be hereinafter described in detail with reference to FIG. 4A to FIG. 11.

FIGS. 4A–4C and FIG. 5 illustrate a vehicle lamp according to one embodiment of the present invention.

The vehicle lamp 1 in these drawings is illustrated as a headlamp to be mounted on the right side portion of a vehicle body. The vehicle lamp 1 can include a bulb 2 as a light source, a first reflecting surface 3, a projection lens 4, a shutter 5, a second reflecting surface 6, a third reflecting surface 7, a fourth reflecting surface 11, and a front lens 8. The first reflecting surface 3 is arranged to surround the bulb 2, so as to reflect light from the bulb 2 toward front. The projection lens 4 is arranged forward of the bulb 2, and it converges direct light from the bulb 2 or reflected light from the first reflecting surface 2 to a predetermined extent. The shutter 5 is arranged in the main optical path of direct light from the bulb 2 or reflected light from the first reflecting surface 3 toward the projection lens 4, so as to block part of the light to attain desired light distribution characteristics. The second reflecting surface 6 is preferably arranged at such a position that light emitted from the bulb 2 to an upward and front direction is reflected by the second reflecting surface 6 to a backward and downward direction. The third reflecting surface 7 can be positioned such that it can reflect light from the second reflecting surface 6 to the front and also to a middle region between the front and right side. The fourth reflecting surface 11 is preferably positioned such that at least part of the light reflected by the third reflecting surface 7 to the front is reflected by the fourth reflecting surface 11 to a lateral direction. The front lens 8 covers at certain distances the projection lens 4, third reflecting surface 7, and fourth reflecting surface 11 from the light emitting side of the vehicle headlamp 1.

The bulb 2 can be any one of known bulbs used for a vehicle headlamp or auxiliary front lamp 2a, such as an incandescent bulb, halogen bulb with or without any infrared reflecting film, or a discharge light source such as a metal halide lamp. The bulb 2 can be fixedly retained in a socket and supplied with power.

The first reflecting surface 3 can have such a construction that it reflects light from the bulb 2 to the front, directing it to the projection lens 4. It can be constituted by an ellipsoidal reflecting surface concave to the front, for example, in which case its first focus is positioned on the bulb 2. The "ellipsoidal reflecting surface" can include a spheroidal surface, free curved surface based on an ellipsoidal shape, and a combination of various ellipsoidal group surfaces which have at least one elliptic cross section.

The projection lens 4 is preferably a convex lens arranged upon an optical axis of the vehicle lamp 1 which extends horizontally through the bulb 2. The projection lens 4 can have its focus in the vicinity of a second focus of the first reflecting surface 3, which is preferably an ellipsoidal reflecting surface as noted above. The projection lens 4 converges direct light from the bulb 2 or reflected light from the first reflecting surface 3 to a predetermined extent and projects the light toward front.

The shutter 5 can be made of a light shading material and positioned in the main optical path between the bulb 2 and projection lens 4 in the vicinity of the focus of the projection lens 4. The shutter 5 is provided for blocking part of direct light from the bulb 2 or reflected light from the first reflecting surface 3 so as to attain desired light distribution characteristics. That is, the light distribution characteristics of the light beam from the projection lens 4 can be adjusted as desired, e.g., to form a low beam, by determining the shape of the shutter 5 as required.

The second reflecting surface 6 can be arranged forward of and above the bulb 2, and constituted by an ellipsoidal reflecting surface such as a spheroidal surface. This ellipsoidal reflecting surface can have its first focus in the vicinity of the bulb 2, and its longitudinal axis across the optical axis of the vehicle headlamp 1. Thus the second reflecting surface 6 preferably reflects incident light to a backward and downward direction.

The third reflecting surface 7 can be positioned below the first reflecting surface 3, and constituted by a parabolic reflecting surface such as a paraboloidal surface. The third reflecting surface 7 preferably has its focus near the second focus of the second reflecting surface 6.

In this embodiment, the third reflecting surface 7 consists of a plurality of, for example two, reflecting portions 7a and 7b. The reflecting portion 7a on the left side of a vertical plane along the optical axis of the vehicle light 1 (right side in FIG.4A) reflects light from the second reflecting surface 6 to a middle region between the front and the side of the vehicle light 1. The reflecting portion 7b on the right side of the vertical plane along the optical axis of the vehicle light 1 (left side in FIG. 4A) reflects light from the second reflecting surface 6 approximately to the front, more precisely, to the front but slightly toward the left side. The "parabolic reflecting surface" can include a paraboloidal surface, free curved surface based on a parabolic shape, and a combination of various parabolic surfaces which have at least one parabolic cross section.

The fourth reflecting surface 11 is preferably positioned in front of the bulb 2 and below the main optical path between the bulb 2 and projection lens 4, and can consist of a plane mirror. The fourth reflecting surface 11 receives reflected light from the right reflecting portion 7b of the third reflecting surface 7 and reflects the same to the right side of the vehicle.

The front lens 8 is made of a transparent material. It can be arranged at the front end on the right side of the vehicle and formed to extend to a side face of the vehicle so as to continuously cover the entire light emitting side of the vehicle lamp 1.

The vehicle lamp 1 of this embodiment can be constructed as described above. When power is supplied to the bulb 2, it emits light. A light distribution pattern element L1 is constituted by light which enters from the bulb 2 directly to or indirectly via the first reflecting surface 3 to the projection lens 4. The projection lens 4 converges the light to a certain extent, whereby the light can be emitted frontward via the front lens 8 in a range of 40° on both left and right sides of 0°, the front. Part of the light traveling to the projection lens 4 can be blocked by the shutter 5, whereby light distribution characteristics of a low beam (illumination range L1 in FIG. 6) are achieved, including no upward light, so as not to cause glare to an oncoming vehicle.

The light emitted forward and upward from the bulb 2 and reflected by the second reflecting surface 6 can be further reflected by the third reflecting surface 7 which is preferably a parabolic reflecting surface, to become approximately parallel light. Parallel light reflected by the portion 7b of the third reflecting surface 7 travels to the fourth reflecting surface 11. This light is reflected by the fourth reflecting surface 11 and illuminated to a lateral direction of the vehicle in a range of, e.g., from 30° to 70° on the right side. Meanwhile, parallel light L3 reflected by the portion 7a of the third reflecting surface 7 passes directly through the front lens 8 and is illuminated to a middle region between the front and the side in a range of, e.g., from 20° to 50° on the right side.

Figure 6:
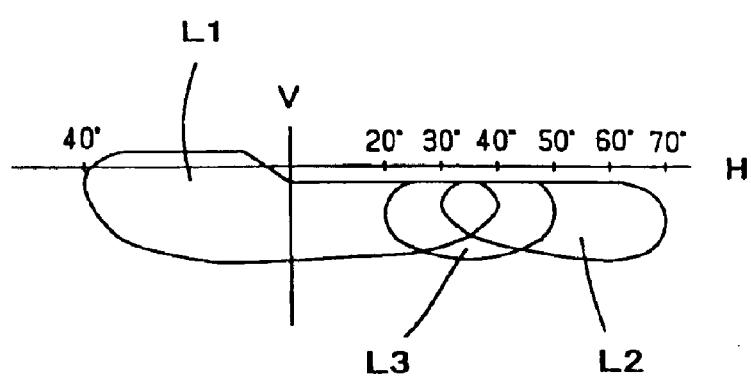
FIG. 6 is a diagram showing a light distribution pattern on a screen of the vehicle headlamp of FIG. 4A to FIG. 4C.

Light passing through the projection lens 4 thus forms a light distribution pattern element L1 which can constitute a major portion of the low-beam light distribution pattern of the vehicle headlamp 1, as shown in FIG. 6. Light reflected by the fourth reflecting surface 11 forms a light distribution pattern element L2 which illuminates into a lateral direction. And light reflected by the portion 7a of the third reflecting surface 7 forms a light distribution pattern element L3 which illuminates a middle region between the front illumination range L1 and the side illumination range L2.

Light emitted to a forward and upward direction from the bulb 2 is therefore effectively utilized, so that illumination into a lateral direction is possible without reducing light amount for illuminating the front.

The light toward the side of the vehicle can be emitted via being reflected by the fourth reflecting surface 11 arranged in such a position that the fourth reflecting surface 11 is located in front of the bulb 2 and below the main optical path. Therefore, the front lens 8 need not be formed to cover a large area including a side face portion of the vehicle body as in the related art. In fact, the front lens 8 preferably only extends to the position denoted at X in FIG. 5. Accordingly, accessories and the like 9 can be disposed at least as far as to the position indicated by Y in FIG. 5. Also, no cutout portions need be provided in the accessories 9 or in the side face of the vehicle, as with the related art. Because the front lens 8 is constructed to be small, limitations on the accessories 9 to be mounted inside the vehicle lamp 1 are reduced, whereby freedom of design for the front lens 8 and vehicle lamp 1 is improved. For example, other lamp elements such as fog lamps can be disposed in front of the fourth reflecting surface 11 (in a space on the backside of the reflecting surface 11), so the headlight assembly including the vehicle lamp 1 can be designed compact.

FIGS. 7A–7C and FIG. 8 illustrate a vehicle lamp 20 according to another embodiment of the present invention.

In this embodiment, the fourth reflecting surface 11 can be attached to a substantially vertical rotating shaft 21 such as to be rotatable therearound by means of a driver 22. Other structures can be substantially the same as those of the vehicle lamp 1 shown in FIG. 4A to FIG. 5. Same or similar constituent elements are given the same reference numerals, and the description thereof will be omitted.

The driver 22 can include a motor 22a and a driving gear 22b. The motor 22a actuates the driving gear 22b to rotate the rotating shaft 21.

Figure 7A:
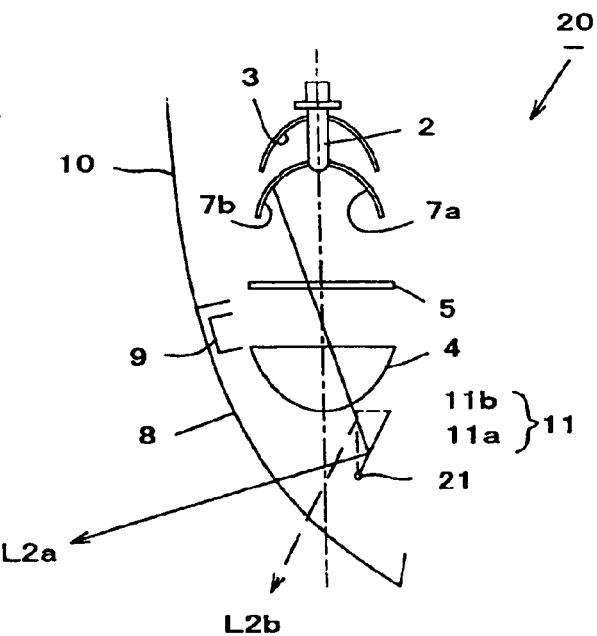
FIG. 7A to FIG. 7C illustrate a vehicle headlamp according to another embodiment of the present invention, FIG. 7A being a schematic cross section taken along the line VIIA—VIIA of FIG. 7B, FIG. 7B being a schematic front view, and FIG. 7C being a schematic cross section taken along the line VIIC—VIIC of FIG. 7B.
Figure 7B:
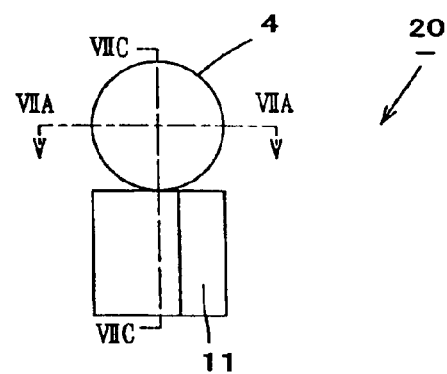
Figure 9A:
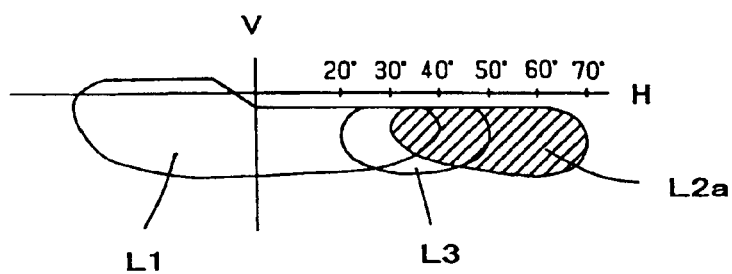
FIG. 9 is a diagram showing a light distribution pattern on a screen of the vehicle headlamp of FIG. 7A to FIG. 7C.
Figure 9B:
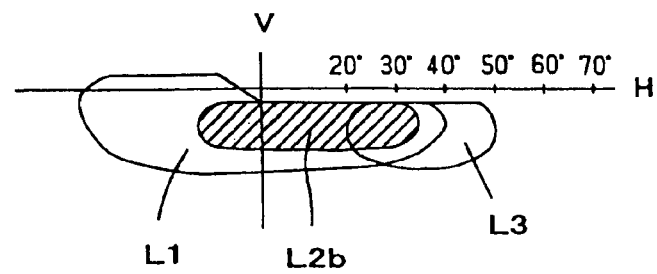
Figure 12:
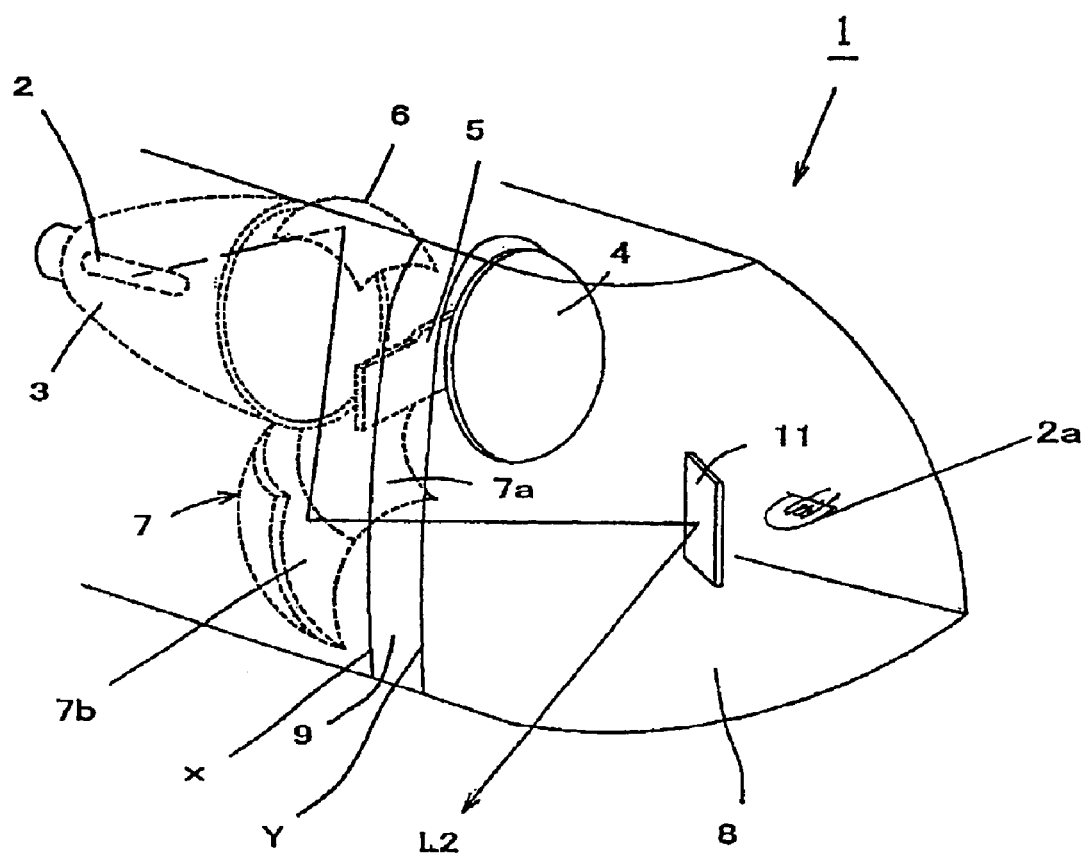
FIG. 12 is a schematic perspective view of a vehicle lamp showing an auxiliary lamp.

The rotation of the rotating shaft 21 moves the fourth reflecting surface 11 between a first position 11a indicated by the solid line and second position 11b indicated by the dotted line in FIG. 7A. When the fourth reflecting surface 11 is at the first position 11a, it reflects light from the portion 7b of the third reflecting surface 7 toward a lateral direction of the vehicle to form a light distribution pattern element L2a, as shown in FIG. 9A. When located at the second position 11b, it reflects light from the third portion 7b toward a predetermined area in the front of the vehicle rather than the side of the vehicle, to form a light distribution pattern element L2b.

With this vehicle headlamp 20, similarly to the vehicle lamp 1 described in the previous embodiment, a major part of light emitted from the bulb 2 can enter directly or indirectly via the first reflecting surface 3 into the projection lens 4, and can be emitted forward through the front lens 8, and form a light distribution pattern element L1. Part of the light emitted from the bulb 2 to a forward and upward direction and reflected by the second reflecting surface 6 can be further reflected by the third reflecting surface 7. Light reflected by the portion 7b of the third reflecting surface 7 can be further reflected by the fourth reflecting surface 11. When the fourth reflecting surface 11 is located at the first position 11a, the light is emitted toward the side of the vehicle through the front lens 8 to form the light distribution pattern element L2a. Meanwhile, light reflected by the portion 7a of the third reflecting surface 7 can be emitted directly through the front lens 8 toward the middle region between the front and side of the vehicle. Thus the vehicle lamp 20 has similar light distribution characteristics shown in FIG. 9A as the vehicle lamp 1.

When the fourth reflecting surface 11 is located at the second position 11b, however, the light reflected by the fourth reflecting surface 11 is preferably emitted into a predetermined area in front of the vehicle through the front lens 8 in a range of about 15° on the left to 35° on the right. The lamp thus has the light distribution characteristics shown in FIG. 9B. At this time, the front illumination of the vehicle is constituted by the light distribution pattern element L1 formed by light from the projection lens 4 and the light distribution pattern element L2b formed by light from the fourth reflecting surface 11. Hence a larger amount for front illumination can be obtained in the low beam mode. The front of the vehicle is accordingly illuminated brighter with this low beam.

Thus, when the fourth reflecting surface 11 is located in the first position 11a, light is directed to the right side of the vehicle. On the other hand, when the fourth reflecting surface 11 is located in the second position 11b, illumination into the lateral direction of the vehicle is suppressed. The latter mode may be used while the vehicle is driving straight, for example, when it is felt that illuminated guard rails are too bright, or that reflection from snow walls on the side of a snowy road is too dazzling.

The driver 22 may be constructed so that the position of the fourth reflecting surface 11 can be switched between the first position 11a and second position 11b, either by a manual or automatic switch. Alternatively, the driver 22 may be rotated continuously in accordance with the steering angle, by means of a controller (not shown).

The rotating shaft 21 may be slightly inclined sideward if it is desired to illuminate a closer side area of the vehicle by the reflected light from the fourth reflecting surface 11 located at the first position 11a. The inclination angle may either be fixed or adjustable.

The construction of the driver 22 should not be limited to the examples above, and it may further incorporate the following and other optional features: The driver 22 may include a power transmission mechanism such as the one shown in FIG. 10A and FIG. 10B, wherein the rotation of the driving gear 22b is transmitted by a belt 22c to a driving wheel 22d attached to the rotating shaft 21. Another possibility is to employ an electromagnetic solenoid for the driving system, for achieving selective (non-continuous) switching between the first position 11a and second position 11b of the fourth reflecting surface 11.

The vehicle lamp 1 shown in FIGS. 4A–4C and FIG. 5 is preferably constructed with a parabolic reflecting surface as the third reflecting surface 7 and a plane mirror as the fourth reflecting surface 11, but the present invention is obviously not limited to this construction. For example, the right reflecting portion 7b of the third reflecting surface 7 may be an ellipsoidal reflecting surface and the fourth reflecting surface 11 may be a parabolic reflecting surface 12, as shown in FIG. 11. In this case, the right reflecting portion 7b has its first focus near the second focus of the second reflecting surface 6, and its second focus in the vicinity of the focus of the fourth reflecting surface 12.

With this arrangement, light emitted from the bulb 2 to a forward and upward direction and reflected by the second reflecting surface 6 is then reflected by the third reflecting surface 7 and converged into the focus of the fourth reflecting surface 12. This light is then reflected by the fourth reflecting surface 12 and emitted to the side of the vehicle as parallel light.

In the embodiments described above, the light distribution pattern elements L2 and L2a can be located in an angle range approximately from 30 to 70 degrees in the right of the vertical axis on the screen. Similarly, specific angle ranges are shown for the light distribution pattern elements L3 and L2b relative to the vertical axis on the screen. However, the illumination angle ranges are not limited thereto, and any other appropriated illumination angle range can be determined, and preferably at least one of the light distribution pattern elements such as L2, L2a, L3, or L2b other than the main light distribution pattern element L1 at least partially overlaps with the main light distribution pattern element L1.

Figure 7C:
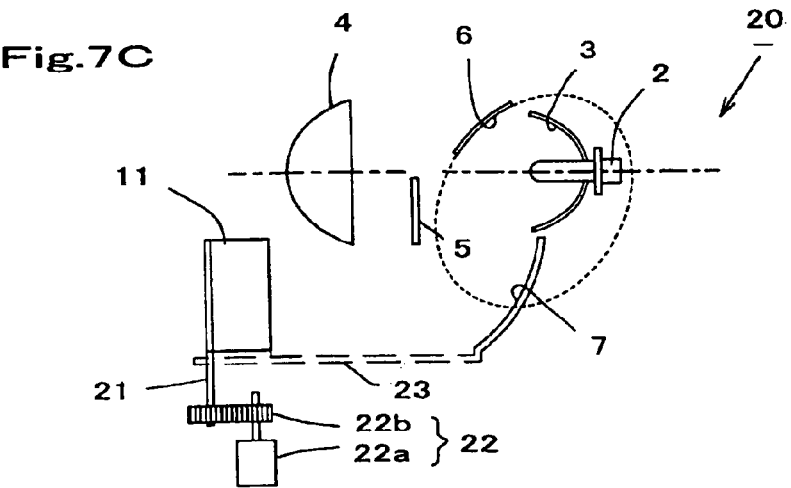
Figure 8:
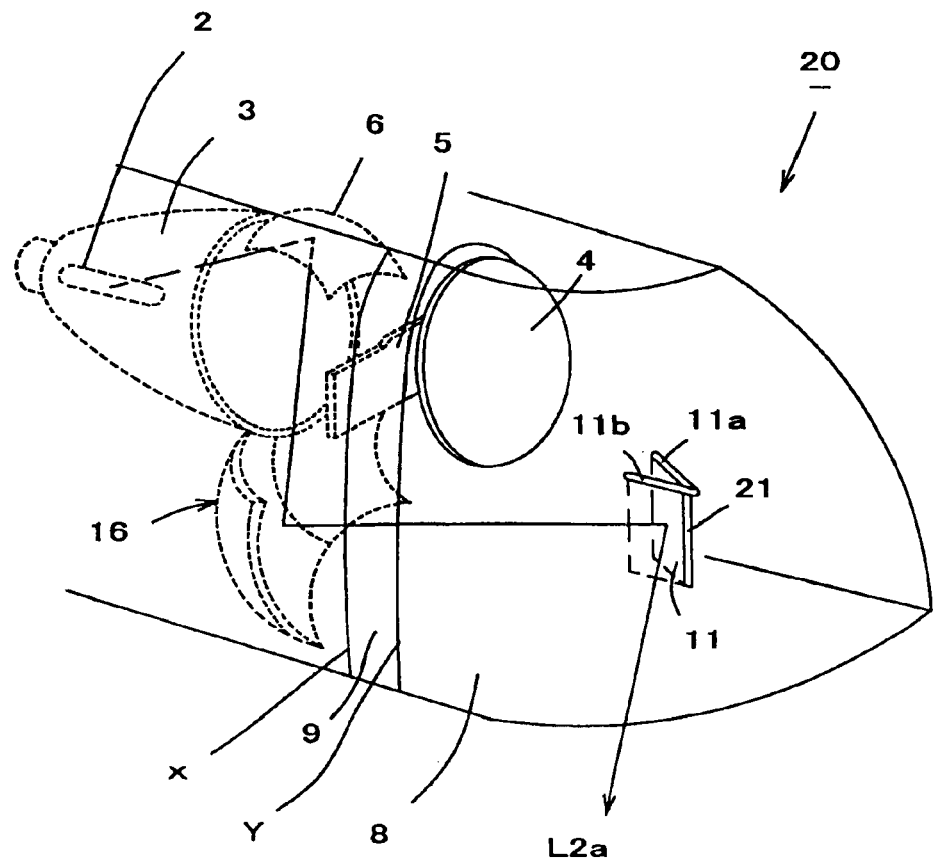
FIG. 8 is a schematic perspective view of the vehicle lamp of FIG. 7A to FIG. 7C.

In the embodiment described above, only the fourth reflecting surface 11 is arranged rotatable around the rotating shaft 21, but as another option, the fourth reflecting surface 11 and the third reflecting surface 7 may be integrally coupled together by a coupling member 23 as indicated by the dotted line in FIG. 7C. The following arrangement would then be possible: The coupling member 23 links the fourth reflecting surface 11 and the portion 7a of the third reflecting surface 7, so that the portion 7a is rotatable. When the fourth reflecting surface 11 is located at the first position 11a, the portion 7a is moved to a position where it can reflect light toward a slightly lateral direction than the case shown by the light distribution pattern element L3 in FIG. 9A, whereby the amount of illumination light to the side of the vehicle is increased by the reflected light from both the portion 7a and the portion 7b. On the other hand, when the fourth reflecting surface 11 is moved to the second position 11b, the portion 7a also moves along therewith and emits light in a direction approximately forward of the vehicle shown by the light distribution pattern element L3 in FIG. 9B. Alternatively, when the fourth reflecting surface 11 is moved to its second position 11b, it may be set that the left reflecting portion 7a is moved with the fourth reflecting surface 11 to illuminate a predetermined front range which is located slightly left than the light distribution pattern element L3 in FIG. 9B. The direction and intensity of illumination are thus controlled as desired, whereby high visibility is achieved.

In the vehicle lamps 1 and 20 described above, the third reflecting surface 7 preferably consists of a paraboloidal reflecting surface. Alternatively, it may be an ellipsoidal reflecting surface such as a spheroidal surface, having a first focus coinciding with the second focus of the second reflecting surface and a second focus in the vicinity of the fourth reflecting surface 11. If an ellipsoidal reflecting surface is to be used for the third reflecting surface 7, then the front lens 8 should preferably be provided with optical cuts appropriately formed on the inner surface thereof, so as to control diffusion of light by the plane type fourth reflecting surface 11. Further, instead of a one-piece third reflecting surface 7 including two portions 7a, 7b, a composite reflecting surface consisting of more than two reflecting regions, or a plurality of separate reflecting surfaces may also be adopted.

The specific examples in the above description of the embodiments are given along with an account of a paraboloidal surface and spheroidal surface for ease of understanding because these surfaces have a certain focus, but the present invention is obviously not limited to these reflecting surfaces. Any other parabolic, or ellipsoidal group reflecting surfaces that have basically the shape of a paraboloidal, or ellipsoidal, surface but are formed by free curved surfaces may also be used. These reflecting surfaces have no focus in strict terms but are capable of converging light with high density near a focus of the parabolic or ellipsoidal reflecting surface on which they are based.

Some advantages of the present invention will now be described. According to the present invention, part of the light emitted from the light source is preferably captured by the second reflecting surface and directed to the third reflecting surface. Then, part of the third reflecting surface reflects the light to the fourth reflecting surface, and the fourth reflecting surface reflects the light to the lateral direction. By such a reflecting surface system, the light from the light source is efficiently used for illuminating the side of the vehicle. By adopting the fourth reflecting surface, the optical path of light traveling from the lastly reflected reflecting surface into the lateral outward direction of the vehicle headlamp can be arranged to start from a relatively forward portion of the vehicle headlamp. Therefore the front lens need not have a large extent on the side face, whereby the freedom of design for the entire vehicle lamp is improved. The present invention thus provides a vehicle lamp which is capable of illuminating the side of the vehicle and which has a simple construction whereby design limitations are reduced.

Also, the present invention can optionally provide a vehicle lamp capable of achieving desired light distribution characteristics by real-time control of the direction and intensity of illuminated light in a range covering the front and the side of the vehicle.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A vehicle lamp comprising:
    a light source;
    a first reflecting surface located adjacent the light source for reflecting light from the light source toward a front of the vehicle lamp along a main optical path;
    a projection lens for converging direct light from at least one of the light source and reflected light from the first reflecting surface toward the front of the vehicle lamp;
    a shutter located in the main optical path of the light from the light source to the projection lens, for blocking part of the main optical path;
    a second reflecting surface located adjacent the light source for reflecting incident light from the light source to a predetermined direction;
    a third reflecting surface located adjacent the light source and out of the main optical path for reflecting incident light from the second reflecting surface toward the front of the vehicle lamp; and
    a fourth reflecting surface located forward of the third reflecting surface and out of the main optical path such that it receives reflected light from the third reflecting surface and reflects the reflected light to a lateral direction relative at least to a region of light emitted from the projection lens along the main optical path.

2. The vehicle lamp according to claim 1, wherein said second reflecting surface is an ellipsoidal reflecting surface having a first focus substantially on the light source;
    said third reflecting surface includes a reflecting surface selected from a group consisting of a parabolic reflecting surface having a focus in the vicinity of a second focus of the second reflecting surface, an ellipsoidal reflecting surface having a first focus in the vicinity of the second focus of the second reflecting surface, and a compound reflector including the parabolic reflecting surface and the ellipsoidal reflecting surface; and
    the third reflecting surface and fourth reflecting surface are configured such that a first part of reflected light from the third reflecting surface is reflected by the fourth reflecting surface while a second part of the reflected light from the third reflecting surface is directly emitted to outside of the vehicle lamp without reaching the fourth reflecting surface.

3. The vehicle lamp according to claim 2, wherein the fourth reflecting surface is attached to a substantially vertical shaft such as to be rotatable about a rotating axis of the substantially vertical shaft.

4. The vehicle lamp according to claim 3, wherein the third reflecting surface is configured such that a region illuminated by said second part of the reflected light from the third reflecting surface overlaps at least part of the light emitted from the projection lens along the main optical path.

5. The vehicle lamp according to claim 4, further comprising:
at least one auxiliary lamp located in front of the fourth reflecting surface.

6. The vehicle lamp according to claim 3, wherein said fourth reflecting surface is capable of switching between a position for reflecting light toward a lateral direction and a position for reflecting light such as to overlap at least part of one of the region illuminated by the light emitted from the projection lens along the main optical path and a region illuminated by the reflected light from the third reflecting surface.

7. The vehicle lamp according to claim 3, further comprising:
at least one auxiliary lamp located in front of the fourth reflecting surface.

8. The vehicle lamp according to claim 2, further comprising:
at least one auxiliary lamp located in front of the fourth reflecting surface.

9. The vehicle lamp according to claim 1, wherein the fourth reflecting surface is attached to a substantially vertical shaft such as to be rotatable about a rotating axis of the substantially vertical shaft.

10. The vehicle lamp according to claim 9, wherein said fourth reflecting surface is capable of switching between a position for reflecting light toward a lateral direction and a position for reflecting light such as to overlap at least part of one of the region illuminated by the light emitted from the projection lens along the main optical path and a region illuminated by the reflected light from the third reflecting surface.

11. The vehicle lamp according to claim 10, further comprising:
at least one auxiliary lamp located in front of the fourth reflecting surface.

12. The vehicle iamp according to claim 9, wherein said third reflecting surface includes one of a compound reflector and a plurality of reflecting surfaces including a first reflecting region for reflecting incident light toward the fourth reflecting surface and a second reflecting region for reflecting incident light away from the fourth reflecting surface; and
the second reflecting region of said third reflecting surface is configured such that a region illuminated by reflected light from the second reflecting region of said third reflecting surface overlaps at least part of a region of light emitted from the projection lens along the main optical path.

13. The vehicle lamp according to claim 9, further comprising:
at least one auxiliary lamp located in front of the fourth reflecting surface.

14. The vehicle lamp according to claim 1, wherein said third reflecting surface includes one of a compound reflector and a plurality of reflecting surfaces including a first reflecting region for reflecting incident light toward the fourth reflecting surface and a second reflecting region for reflecting incident light away from the fourth reflecting surface; and
the second reflecting region of said third reflecting surface is configured such that a region illuminated by reflected light from the second reflecting region of said third reflecting surface overlaps at least part of a region of light emitted from the projection lens along the main optical path.

15. The vehicle lamp according to claim 14, further comprising:
at least one auxiliary lamp located in front of the fourth reflecting surface.

16. The vehicle lamp according to claim 1, further comprising:
at least one auxiliary lamp located in front of the fourth reflecting surface.

17. The vehicle lamp according to claim 1, wherein the projection lens converges light to a predetermined extent in front of the vehicle lamp.

18. The vehicle lamp according to claim 1, further comprising:
a front lens covering a light emitting region of the vehicle lamp.

19. The vehicle lamp according to claim 1, wherein the third reflecting surface is located forward of the light source and backward of the projection lens.

20. A method of using the vehicle lamp as recited in claim 1, comprising:
providing a light source, a first reflecting surface located adjacent the light source for reflecting light from the light source toward a front of the vehicle lamp along a main optical path, a projection lens located in front of the light source, a second reflecting surface located adjacent the light source for reflecting incident light from the light source to a predetermined direction, a third reflecting surface located adjacent the light source and out of the main optical path for reflecting incident light from the second reflecting surface toward the front of the vehicle lamp, and a fourth reflecting surface located forward of the third reflecting surface and out of the main optical path, such that it receives reflected light from the third reflecting surface and reflects the reflected light to a lateral direction relative at least to a region of light emitted from the projection lens along the main optical path;
causing the light source to produce light;
reflecting the light from the light source to the front of the vehicle lamp with the first reflecting surface; and
reflecting light from the light source of the vehicle lamp with the second reflecting surface, third reflecting surface and fourth reflecting surface such that the light travels beyond the projection lens and is subsequently redirected into the lateral direction by the fourth reflecting surface.

* * * * *